United States Patent
Peng et al.

(10) Patent No.: US 6,737,369 B2
(45) Date of Patent: *May 18, 2004

(54) CURED NON-WOVEN MAT OF A MIXTURE OF FIBERS

(75) Inventors: Qinyun Peng, Yorktown Heights, NY (US); Krishna Srinivasan, Mahwah, NJ (US); Bill Bittle, York, SC (US); Betty C. Roberts, Chester, SC (US); Mark McAteer, Rock Hill, SC (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/282,676

(22) Filed: Oct. 29, 2002

(65) Prior Publication Data

US 2003/0054714 A1 Mar. 20, 2003

Related U.S. Application Data

(63) Continuation-in-part of application No. 09/759,043, filed on Jan. 12, 2001, now Pat. No. 6,544,911, which is a continuation-in-part of application No. 09/484,749, filed on Jan. 18, 2000.

(51) Int. Cl.$^7$ .............................................. B32B 27/12
(52) U.S. Cl. .................. 442/157; 428/36.1; 428/40.3; 428/40.4; 428/43; 428/49; 428/74; 428/141; 428/142; 428/143; 428/144; 428/145; 428/149; 428/292.1; 428/297.4; 428/299.4; 428/484; 428/505; 428/524; 428/147; 442/160; 442/170; 442/171; 442/176; 442/178; 442/180; 442/301; 52/514; 52/514.5; 52/518; 52/534; 52/537; 156/164.4; 162/157.1; 162/157.2; 162/157.5
(58) Field of Search ................ 428/36.1, 40.3, 428/40.4, 43, 49, 24, 141, 142, 143, 144, 145, 149, 292.1, 297.4, 297.7, 299.4, 464, 505, 524, 147; 442/157, 160, 170, 171, 174, 176, 178, 180, 301; 52/514, 514.5, 518, 534, 537; 156/164.4; 162/157.1, 157.2–157.5

(56) References Cited

U.S. PATENT DOCUMENTS

| 3,865,682 | A | * | 2/1975 | Marzocchi | .................. 428/378 |
| 4,335,186 | A | | 6/1982 | Marzocchi et al. | |
| 4,430,465 | A | | 2/1984 | Abbott | |
| 4,472,243 | A | | 9/1984 | Bondoc et al. | |
| 4,500,600 | A | | 2/1985 | Wong et al. | |
| 5,518,586 | A | * | 5/1996 | Mirous | ....................... 162/156 |
| 5,585,432 | A | | 12/1996 | Lee et al. | |
| 5,744,229 | A | | 4/1998 | Gleason et al. | |

* cited by examiner

Primary Examiner—Arti R. Singh
(74) Attorney, Agent, or Firm—Marvin Bressler; Philip Braginsky; William J. Davis

(57) ABSTRACT

A coated fiber mat of improved tear strength upon dividing pieces of the coated mat and the coating is provided. The coated mat is a cured, non-woven mat including a mixture of fibers having different fiber lengths. The fibers contain a polysiloxane compound and are fixedly distributed in a binder.

15 Claims, 1 Drawing Sheet

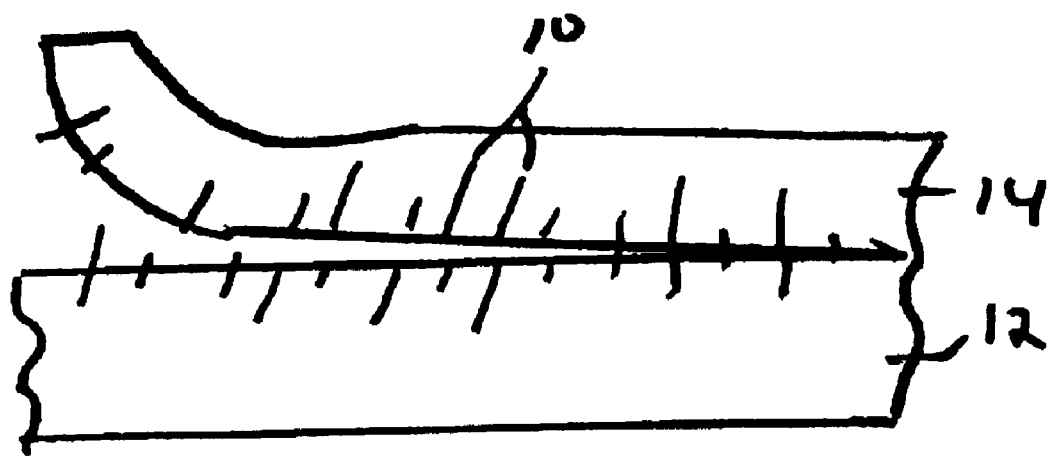
Figure

CURED NON-WOVEN MAT OF A MIXTURE OF FIBERS

RELATED APPLICATIONS

This application is a continuation-in-part application of U.S. Ser. No. 09/759,043, filed Jan. 12, 2001, now U.S. Pat. No. 6,544,911, which is a continuation-in-part application of U.S. Ser. No. 09/484,749, filed Jan. 18, 2000, the entire contents of which are incorporated herein by reference.

FIELD OF THE INVENTION

The present invention relates to a cured, siloxane-containing non-woven fiber mat having fibers of different lengths that can be suitably employed as a roofing or other building composite requiring improved tear strength.

BACKGROUND OF THE INVENTION

In the building composite industry, various methods have been developed in an attempt to improve the mat strength and stability of non-woven fiberous mats. Many efforts are focused on modifying the binder systems. The following patents and publications are representative of such endeavors:

U.S. Pat. No. 4,335,186 discloses a chemically modified asphalt composition where the asphalt is reacted with a nitrogen-containing organic compound which is capable of introducing to the asphalt functional groups that can serve as reactive sites to establish a secure chemical bond between the asphalt and reinforcing fillers, blended into the asphalt, such as glass fibers and siliceous aggregates.

U.S. Pat. No. 4,430,465 relates to an article of manufacturing comprising mat fibers, such as glass fibers, that are coated with a composition comprising asphalt, an alkadiene-vinylarene copolymer, a petroleum hydrocarbon resin and a branched organic amine which is employed as an anti-stripping agent.

U.S. Pat. No. 5,518,586 provides a method of making a glass fiber mat comprising dispersing glass fibers in an aqueous medium containing hydroxyethyl cellulose to form a slurry; passing the slurry through a mat forming a screen to form a wet fiber glass mat; applying a binder comprising a urea-formaldehyde resin, a water-insoluble anionic phosphate ester and a fatty alcohol to the wet glass fiber mat; and curing the binder.

U.S. Pat. No. 5,744,229 discloses a glass fiber mat made with a polymer-reacted asphalt binder. The disclosed binder of the glass fiber mat includes an aqueous emulsion of a polymer modified asphalt produced by the reaction of asphalt, a surfactant, and a phenol-, resorcinol-, urea- or melamine-formaldehyde resin.

U.S. Pat. No. 4,500,600 describes glass fibers coated with a size composition comprising γ-aminopropyltriethoxysilane and an alkoxysilane.

In addition to modifying the binder systems, some efforts have focused on increasing the mat strength through the use of fibers having different lengths. For example, U.S. Pat. No. 4,472,243 provides a sheet type felt material and sheet type roofing material such as shingles and rolls made therefrom. The felt comprises 10–60 weight % glass fibers having varying lengths, 15–80 weight % cellulose fiber and 5–25 weight % binder. The binder include acrylamides, starch, urea resins, phenol resins, sodium silicates, epoxy resins, styrene-butadiene rubber, acrylic, neoprene, and acrylonitrile.

U.S. Pat. No. 5,585,432 discloses reinforced polymer composites having a uniform mixture of reinforcing fibers having a polymordal length distribution and having polymer particles distributed therein. Fillers such as silicon dioxide, calcium carbonate, magnesium oxide, $CaSiO_3$ and mica may also be present in the polymer composite.

Although improved mat strength may be accomplished using fibers of different lengths, this improved strength typically does not hold when a shingle is formed by coating the mat with asphalt. In view of the above drawbacks with the prior art, there is still a continued need to provide a new and improved non-woven mat which has improved tear strength even after it is coated with asphalt.

SUMMARY OF THE INVENTION

The present invention provides a cured, non-woven mat that has improved tear strength which strength is also transferable to a roofing material, i.e., shingle, sheet or roll, when the inventive mat is coated with asphalt. Specifically, the inventive cured, non-woven mat comprises a mixture of fibers having different fiber lengths, which fibers contain a polysiloxane compound, and are fixedly distributed in a binder. By using the differing fiber lengths in conjunction with a polysiloxane compound, lower weight mats can be produced that render similar shingle tear properties as a higher weight mat. The extent of this improvement is dependent on the fiber lengths and the amounts of different fibers employed.

Another aspect of the present invention relates to an asphalt roofing material which includes the inventive cured, siloxane-containing non-woven mat which is coated with asphalt.

Although several methods of making non-woven fiber mats can be employed to form the inventive cure, siloxane-containing mat, a wet laid process where the fibers having differing lengths are dispersed in white water to form a wet web derived from a slurry or mat is preferred. Optionally a dispersing agent, emulsifier, lubricant, defoamer, surfactant and/or other conventional excipients can be added to the fiber containing slurry of the present invention. In a mat forming machine such as a paper pulp apparatus, e.g., a FQURDRINIER®paper machine, excess water is removed from the slurry to form the web. A binder such as disclosed in U.S. Pat. No. 6,544,611 is then applied to the wet web as a 5 to 40% aqueous solution, dispersion or emulsion by employing the use of a curtain coater or a dip and squeeze or knife edge applicator. Alternatively, the binder can be sprayed onto the binder web.

Following binder saturation of the web, excess binder is removed and a web containing a siloxane polymer is then dried and cured at a temperature of between 200° C.–400° C. for a period of time from a few seconds to about 5 minutes. The siloxane can be introduced after or in admixture with the binder solution, or, if desired, a portion or all of the siloxane can be introduced into the fiber size or slurry before addition of the binder. The siloxane component is employed in the form of a solution, suspension emulsion or dispersion in water or in an organic solvent such as isopropanol, cyclohexanol or other inert organic solvent. For the purposes of the present invention, a coating of polysiloxane or asphalt can be added as a top coat on the cured mat.

BRIEF DESCRIPTION OF THE DRAWINGS

The sole FIGURE in the present invention is a top plan view illustrating the separation of a composite which comprises a glass fiber mat of the present invention having an asphalt coating which penetrates the mat.

DETAILED DESCRIPTION OF THE INVENTION

As stated above, the present invention provides a cured, non-woven mat and an asphalt coated roofing material which products both exhibit improved tear strength. The inventive cured, non-woven mat comprises a mixture of fibers having different fiber lengths, which fibers contain a polysiloxane compound, and are fixedly distributed in a binder. Specifically, the inventive cured, non-woven mat comprises from about 50 to about 95 weight % of said fibers containing from about 0.001 to about 20 weight % of polysiloxane and from about 5 to about 50 weight % of said binder. More preferably, the cured, non-woven mat of the present invention comprises from about 65 to about 90 weight % of said fibers containing from about 0.01 to about 10 weight % of polysiloxane, which fibers are fixedly distributed in from about 10 to about 35 weight % of said binder.

The fibers of the inventive mat include, but are not limited to: fibers of glass, wood or pulp particles, polyethylene, polypropylene, polyester, nylon, Orlon®acrylic fibers or mixtures of these fibers depending on the end use of the mat. When the inventive matters employed as a roofing shingle, acoustical board, built-up roofing (BUR) or other asphaltic composite, a majority of the fibers present in the mat of glass fibers which are preferably unmixed. For facers or underlayment used in different articles of building construction, e.g., divider panels, other synthetic fibers or wood chips fixed in a mat can be utilized.

As stated above, the mat fibers employed in the present invention have different fiber lengths associated therewith. Specifically, the inventive mat comprises a mixture of fibers where from about 0 to about 100 weight % of the fibers have an average length of from about 0.5 to about 60 mm and from about 0 to about 100 weight % of the fibers have an average length of from about 10 to about 150 mm. More preferably, the inventive mat comprises from about 20 to about 80 weight % of fibers having an average length of from about 10 to about 45 mm and from about 20 to about 80 weight % of fibers having an average length of from about 30 to about 80 mm. The fibers having differing fiber lengths typically have an average diameter of from about 1 to about 100 $\mu$m, with an average diameter of from about 5 to about 25 $\mu$m being more highly preferred. The fibers can be obtained from commercial sources or made by techniques well known to those skilled in the art.

The polysiloxane component of the inventive mat is a polysiloxane compound having repeating units of —[SiO]—. The siloxane polymer can be modified with various substituents which include linear, branched or aromatic end-groups that may optionally contain oxygen, sulfur and/or nitrogen. Generally, the polysiloxanes are classified as polyalkyl-, polyaryl, polyalkylaryl- and polyethersiloxanes. The polysiloxanes found to be highly useful in the present invention are those having a weight average molecular weight (MW) of at least 600. In a highly preferred embodiment, the polysiloxane is a polydialkylsiloxane compound, with polydimethylsiloxane being most preferred.

Illustrative examples of suitable polysiloxanes that can be employed in the present invention include, but are not limited to: polyalkylene oxide-modified polydimethylsiloxane-dimethylsiloxane copolymer (MW=13,000); polyalkylene oxide-modified polydimethylsiloxane-dimethylsiloxane copolymer (MW=3000); polyalkylene oxide-modified polydimethylsiloxane-dimethylsiloxane copolymer (MW=4000); (carboxylatepropyl)methylsiloxane-dimethylsiloxane copolymer (MW>1000); dimethylsiloxane-(60% PO-40% EO) block copolymer (MW=20,000); (hydroxyalkyl functional) methylsiloxane-dimethylsiloxane copolymer (MW=5000); aminopropylmethylsiloxane-dimethylsiloxane copolymer MW=4500); aminoethylaminopropylmethoxysiloxane-dimethylsiloxane copolymer (MW>1000); glycidoxy propyl dimethoxy silyl end-blocked dimethyl siloxane polymer (MW=5000); methacryloxy propyl dimethyoxy silyl dimethyl siloxane polymer (MW=40,000); vinyl dimethoxy silyl end-blocked dimethyl siloxane polymer (MW=6500); aminoethylaminopropyl dimethoxy silyl end-blocked dimethyl siloxane polymer (MW=3800); amine-alkyl modified methylalkylaryl silicone polymer (MW=7800); epoxy functional dimethylpolysiloxane copolymer (MW=8300); dimethylpolysiloxane (MW=26,439); dodecylmethylsiloxane-hydroxypolyalkyleneoxypropyl methylsiloxane copolymer (MW=1900); (dodecylmethylsiloxane)-(2-phenylpropylmethylsiloxane) copolymer (MW>1000) and polyalkylene oxide-modified polydimethylsiloxane-dimethylsiloxane copolymer (MW=600).

The binder employed in the present invention includes conventional binders such as acrylamides, starch, urea resins, phenol resins, sodium silicates, epoxy resins, styrene-butadiene rubber, acrylic, neoprene, acrylonitrile and other nature or synthetic lattices. A highly preferred binder employed in the present invention is a modified formaldehyde type binder disclosed in U.S. application Ser. No. 09/759,043, the entire content of which was previously incorporated herein by reference. Specifically, the preferred binder is a formaldehyde binder containing about 0.1 to about 20 weight % of a crosslinked styrene/acrylic or methacrylic, (designated herein as (meth)acrylic), copolymer as a binder modifier. More preferably, the formaldehyde binder resin employed in the present invention contains from about 0.05 to about 15 weight % of a 0.05 to about 10 weight % crosslinked styrene/acrylic polymer modifier.

The formaldehyde type binder base is a thermosetting resin of formaldehyde in combination with urea, phenol, resorcinol, melamine or mixtures thereof. Of these, the formaldehyde/urea binder base is preferred. The binder base contains a binder modifying amount of a styrene/acrylic resin containing a polyfunctional component which crosslinks with the copolymer resin during mat curing. The styrene component in the resin can be unsubstituted or substituted on a ring carbon atom with a lower alkyl, vinyl, allyl, chloro or phenyl group; however, from the standpoint of economics; notwithstanding the reduced flammability and high thermal stability of some of these substituted types, unsubstituted styrene is most preferred.

The styrene/acrylic resin, which includes acrylic, methacrylic moieties and mixtures thereof, contains a minor amount, e.g., between about 0.05 to about 10 weight %, preferably between about 0.1 to about 5 weight %, of a crosslinking agent, such as a polyfunctional amine, amide, or acrylonitrile. Alternatively, the polyfunctional crosslinking agent may be any other polyfunctional crosslinking agent such as, for example, a di- or tri-olefinically unsaturated hydrocarbon or other conventional crosslinker that is reactive with the styrene/acrylic copolymer.

Of the above-mentioned polymer compositions, those providing self-crosslinkable characteristics are preferred. The (meth)acrylic polymer is generally a mixture of (meth)acrylates and additionally may contain (meth)acrylonitriles, (meth)acrylic acid and/or (meth)acrylamides as comonomers. One advantage of the preferred modified binder is that it allows for curing at a lower temperature than would otherwise be required for a mat containing siloxane/formaldehyde type binder alone. It is believed that this benefit is attributed to the crosslinking of the modifier. Another advantage of the preferred binder is a degree of flexibility contributed by the styrene comonomer.

Reference is now made to the sole drawing accompanying the present application which is a top plan view illustrating the separation of a composite which comprises a glass fiber mat of the present invention having an asphalt coating which penetrates the mat. The portions of the coated mat being separated are indicated by reference numerals 12 and 14 with fibers 10 of different lengths bridging the separated area and resisting disunion before total separation occurs.

For the manufacture of roofing shingles or BUR, a polysiloxane containing fiber glass mat with the above mentioned modified urea/formaldehyde binder is preferred. The dried, cured mat may be covered on one or both sides with a conventionally thick coating of a standard asphalt or asphalt compound to produce a composite roofing product which can be cut to any size or shape or used as undivided BUR sheeting and packaged in pallets or rolls for shipment and subsequent installation. In the case of BUR roofing, however, coating or mopping of the mat with a hot surface coating of asphalt is generally delayed until a coarse sheeting is installed on the roof. The asphalt employed in the present invention for coating may additionally contain a conventional antifungal, antibacterial, UV inhibitor and/or coloring agent.

The roofing product provided by the present invention is a product of conventional weight and somewhat increased flexibility which meets and exceeds the requirements of ASTM D-3462 testing. The significantly improved tear strength of the present product results in savings in packaging and transportation of the product as well as durability of the product when installed.

The following examples are provided to illustrate some of the advantages that can be obtained from the present invention.

EXAMPLES 1–5 AND COMPARATIVE EXAMPLES 1–5

Testing Tear Strength of 3×2.5 inch samples of Shingles Employing Glass Fiber Mats With Urea/Formaldehyde (UF) Modified Binder Tear test D-1922, as referenced in ASTM D-3462 (Jul. 10, 1997 version), was used to determine the tear strength of various glass fiber mats coated on both sides with a 25 mil coating of asphalt conventionally used in roofing materials. In summary, this test measures the force in grams required to tear apart the coated mat specimen using a pendulum device. Acting by gravity, the pendulum swings through an arc tearing the specimen from a precut slit. The test specimen is held at one end by the pendulum and on the opposite end by a stationary member. The loss in energy by the pendulum is indicated by a scale and pointer, which registers in the force required to tear apart the specimen.

To a wet web of 30–40 mm long glass fibers, derived from drainage of a white water slurry, was added at room temperature, a standard urea/formaldehyde binder containing 1% wt. styrene/butadiene polymer modifier to provide a fiber to polymer binder weight ratio of about 75:25. The urea/formaldehyde binder was obtained from Dynea Co. and the styrene/butadiene latex was from Dow Chemical Co. The basis weight of the fiber glass mat was controlled around 85 grams per square meter. The web containing fibers and polymer binders was then sprayed with an aqueous solution of poly(dimethylsiloxane), supplied by Chem-Trends as product RCTW B9296) to provide a polysiloxane concentration of 1% w/w with respect to polymer binders. The resulting webs were then dried and cured at about 300° C. for a period of 10 seconds to produce cured, nonwoven mats, after which the mats were coated on both sides at 215° C. with filled asphalt (comprising 32% w/w asphalt and 68% w/w limestone filler) using a two-roller coater.

In comparative examples 1–5, the same specimens were prepared as the samples in examples 1–5, except they were not sprayed with the polysiloxane solution.

The results of these tests are as reported in following Table 1.

TABLE 1

|  | Fibers (wt. % and length) | Polysiloxane wt. % | Tear strength gram force (gf) | Standard deviation *(N = 9) | Statistical significance compared to the comparative examples |
|---|---|---|---|---|---|
| Example No. |  |  |  |  |  |
| 1 | 100% 30 mm fiber | 1 | 1573 | 173 | Yes-at 99% confidence level |
| 2 | 100% 40 mm fiber | 1 | 1498 | 259 | Yes-at 99% confidence level |
| 3 | 70% 30 mm fiber + 30% 40 mm fiber | 1 | 1313 | 155 | Yes-at 99% confidence level |
| 4 | 50% 30 mm fiber + 50% 40 mm fiber | 1 | 1608 | 129 | Yes-at 99% confidence level |
| 5 | 30% 30 mm fiber + 70% 40 mm fiber | 1 | 2079 | 438 | Yes-at 99% confidence level |
| Comparative Example No. |  |  |  |  |  |
| 1 | 100% 30 mm fiber | 0 | 992 | 134 |  |
| 2 | 100% 40 mm | 0 | 1047 | 259 |  |

TABLE 1-continued

|   | Fibers (wt. % and length) | Polysiloxane wt. % | Tear strength gram force (gf) | Standard deviation *(N = 9) | Statistical significance compared to the comparative examples |
|---|---|---|---|---|---|
| 3 | fiber 70% 30 mm fiber + 30% 40 mm fiber | 0 | 964 | 74 | |
| 4 | 50% 30 mm fiber + 50% 40 mm fiber | 0 | 991 | 97 | |
| 5 | 30% 30 mm fiber + 70% 40 mm fiber | 0 | 1105 | 245 | | wherein:
N = sample size

The results in Table 1 establish that the presence of a polysiloxane in the glass mat having fibers of different lengths substantially improves the tear strength of shingles, especially the polysiloxane containing mat having a higher percentage of longer fibers. The optimum percentage of longer fibers in the mat is around 40–80% in the fiber mixture for the best tear strength of the shingle.

EXAMPLE 6 AND COMPARATIVE EXAMPLES 6–7

In example 6, the sample was prepared as the ones in examples 1–5 with the basis weight of the fiber glass mat controlled around 85 grams per square meter.

In comparative examples 6–7, the samples were prepared as the ones in comparative examples 1–5 with the basis weight of the fiber glass mat controlled at 85 and 92 grams per square meter respectively.

The results of these tests are as reported in following Table 2.

TABLE 2

|  | Fibers (wt. % and length) | Basis weight of fiber glass mat (gsm) | Polysiloxane wt. % | Tear strength gram force (gf) | Standard deviation (N = 9) | Statistical significance compared to the comparative examples |
|---|---|---|---|---|---|---|
| Examples No. | | | | | | |
| 6 | 30% 30 mm fiber + 70% 40 mm fiber | 85 | 1 | 1594 | 126 | Yes-at 99% confidence level |
| Comparative examples | | | | | | |
| 6 | 30% 30 mm fiber + 70% 40 mm fiber | 85 | 0 | 1256 | 91 | |
| 7 | 100% 30 mm fiber | 92 | 0 | 1290 | 184 | |

The results in Table 2 establish that the presence of a polysiloxane in the glass mat having fibers of different lengths not only substantially improves the tear strength of shingle with the same basis weight mat but also gives a higher shingle tear strength than with a higher basis weight mat.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the spirit and scope of the appended claims.

What is claimed is:

1. A cured, non-woven mat comprising a mixture of fibers having different fiber lengths, said fibers containing a polysiloxane compound, and fixedly distributed in a binder.

2. The cured, non-woven mat of claim 1 wherein from about 0 to about 100 weight % of said fibers having a fiber length of from about 0.5 to about 60 mm, and from about 0 to about 100 weight % of said fibers have a fiber length of from about 10 to about 150 mm.

3. The cured, non-woven mat of claim 2 wherein from about 20 to about 80 weight % of said fibers have a fiber length of from about 10 to about 45 mm, and from about 20 to about 80 weight % of said fibers have a fiber length of from about 30 to about 80 mm.

4. The cured, non-woven mat of claim 1 wherein said fibers are glass, wood, polyethylene, polypropylene, polyester, nylon, Orlon®acrylic or mixtures thereof.

5. The cured, non-woven mat of claim 4 wherein said fibers are glass fibers having an average diameter of from about 1 to about 100 µm.

6. The cured non-woven mat of claim 1 wherein said fibers are present in an amount of from about 50 to about 95 weight %, said polysiloxane is present in an amount of from about 0.001 to about 20 weight % and said binder is present in an amount of from about 5 to about 50 weight %.

7. The cured, non-woven mat of claim 6 wherein said fibers are present in an amount of from about 65 to about 90 weight %, said polysiloxane is present in an amount of from about 0.01 to about 10 weight % and said binder is present in an amount of from about 10 to about 35 weight %.

8. The cured, non-woven mat of claim 1 wherein said binder is formaldehyde type binder containing between about 0.1 to about 20 weight % of a crosslinked styrene/(meth)acrylic polymer binder modifier.

9. The cured, non-woven mat of claim 8 wherein said formaldehyde type binder comprises formaldehyde and a compound selected from the group consisting of urea, phenol, resorcinol, melamine and mixtures thereof.

10. The cured, non-woven mat of claim 9 wherein said compound is urea.

11. The cured, non-woven mat of claim 8 where the styrene/(meth)acrylic polymer is crosslinked with a polyfunctional nitrogen-containing crosslinking agent.

12. The cured, non-woven mat of claim 1 wherein said polysiloxane is a polyalkylsiloxane.

13. The cured, non-woven mat of claim 12 wherein said polyalkylsiloxane is polydimethylsiloxane.

14. The cured, non-woven mat of claim 1 wherein said mat is a roofing material and is coated on at least one surface with asphalt.

15. The cured, non-woven mat of claim 1 wherein said mat is a glass mat employed in a roofing shingle.

* * * * *